April 20, 1943.  F. G. OXLAND  2,317,109
PRESSURE GAUGE
Filed Nov. 26, 1941  2 Sheets-Sheet 1
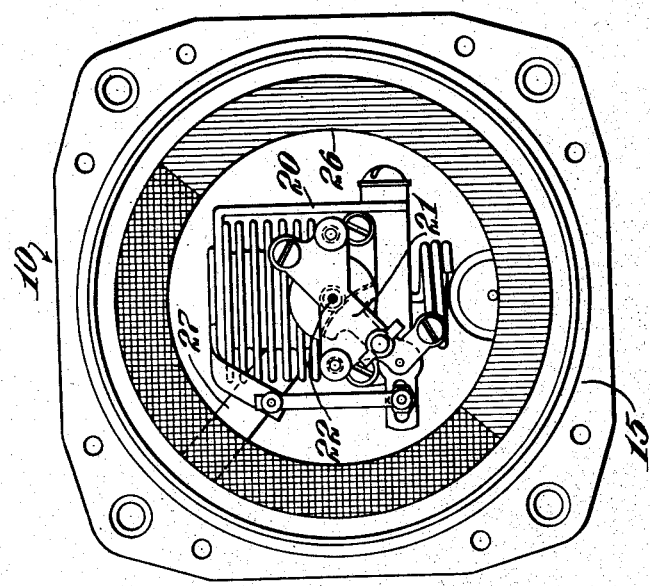
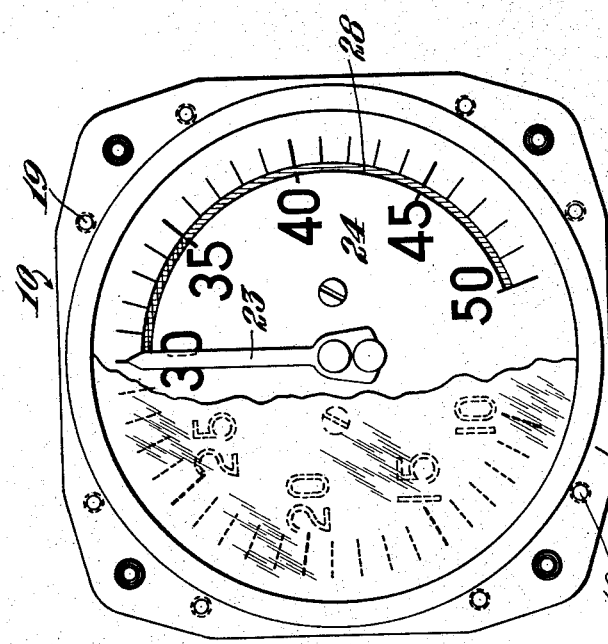
Inventor
Frederick G. Oxland
by Roberts, Cushman & Woodbury
att'ys April 20, 1943.  F. G. OXLAND  2,317,109
PRESSURE GAUGE
Filed Nov. 26, 1941  2 Sheets-Sheet 2
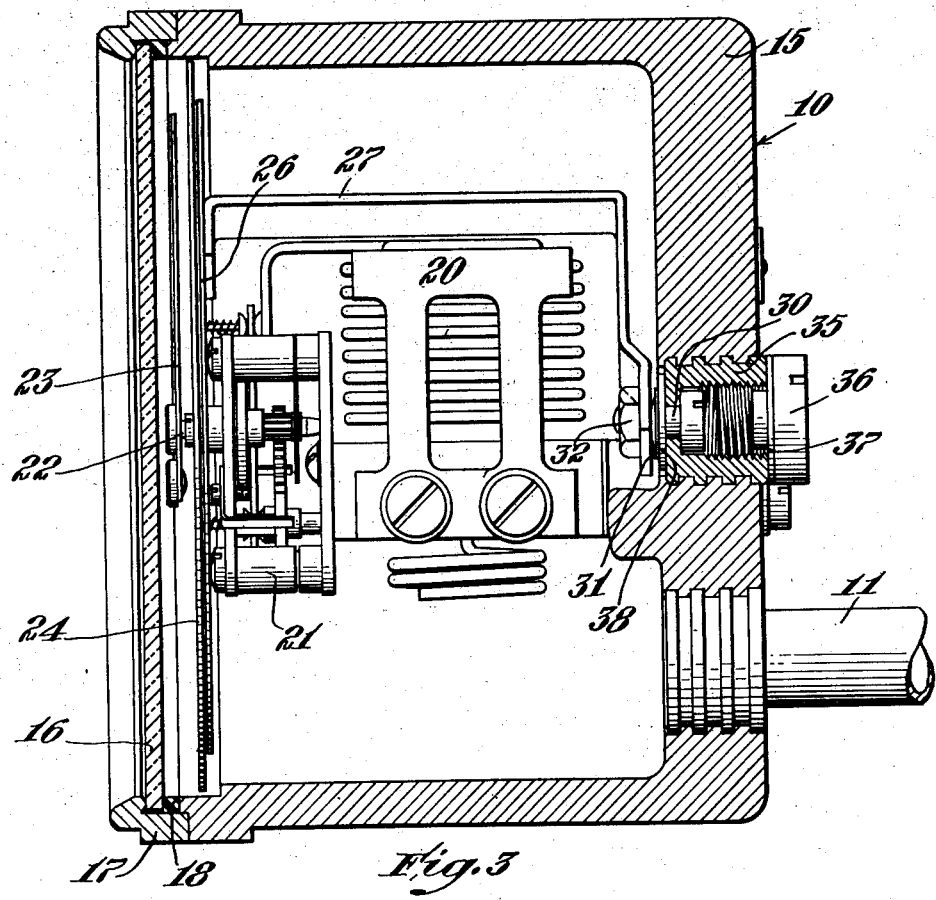
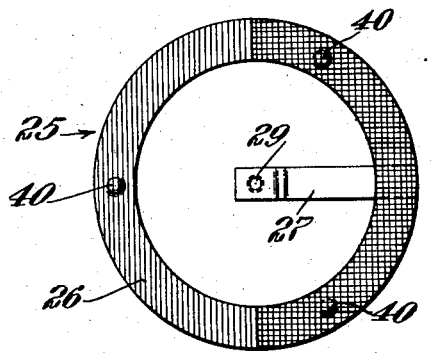
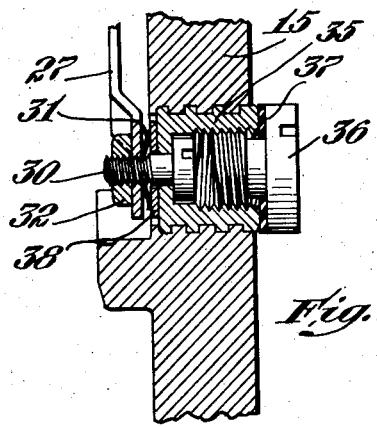
Inventor
Frederick G. Oxland
by Roberts, Cushman & Woodberry
attys.

Patented Apr. 20, 1943

2,317,109

UNITED STATES PATENT OFFICE 2,317,109

PRESSURE GAUGE

Frederick G. Oxland, Bridgeport, Conn., assignor to Manning, Maxwell & Moore, Incorporated, Bridgeport, Conn., a corporation of New Jersey Application November 26, 1941, Serial No. 420,489

10 Claims. (Cl. 73—110)

This invention relates to an improvement in pressure gauges, and more particularly in the provision of an adjustable warning unit by which a warning line is provided at the dial of the gauge to assist the operator in the safe operation of the machine equipped with such gauge.

The invention will be described as employed in a manifold pressure gauge by which the operator of an engine, e. g. an airplane engine, is advised of the pressure set up in the manifold of the engine. The manifold pressure of such an engine, usually indicated in inches of mercury or psi absolute, is a measure of the horsepower being developed by the engine. Each engine has a maximum value of manifold pressure specified by the manufacturer as the top limit for the engine. The engine can be run at such pressure for very short periods only, as during takeoffs at sea level, and if the pressure be exceeded the engine will overheat and be almost instantaneously ruined.

The primary object of this invention is to provide a visual warning on the dial of a pressure gauge so that the operator will be less likely to exceed the top limit of manifold pressure, such warning being of the type which can be easily adjusted when the gauge is installed and be easily reset if the engine be changed.

Heretofore it has been common practice to mount the warning permanently on the dial. Such warnings can only be changed or replaced by removing the front glass of the gauge which is, of course, cumbersome and undesirable. Attempts have also been made to provide warning devices which are adjustable, but such devices have not proven satisfactory because of the expense and difficulties involved in manufacture due to the complexity of the devices and the fact that the adjustments could only be made through a complicated series of gearing in mesh with a ring gear on the device which was mounted directly below the dial.

One embodiment of this invention will be described in detail and illustrated in the following drawings in which Fig. 1 is a front plan view of a pressure gauge equipped with a warning unit in accordance with this invention;

Fig. 2 is a front view with the dial and bezel ring assembly removed;

Fig. 3 is an enlarged cross-sectional view of such gauge;

Fig. 4 is a view of the warning unit; and

Fig. 5 is a sectional view illustrating the mounting of the warning unit.

The pressure gauge 10 selected to illustrate this invention is suitably mounted on an instrument board and connected through a pipe 11 with the manifold of an engine (not shown) so that it indicates the variable pressure set up in that manifold during the operation of the engine.

The gauge 10 includes a casing 15 of the usual type having its open end closed by a glass disk 16 mounted in a bezel ring 17. A gasket 18 seals the joinder of the disk 16 with the bezel ring 17 and the bezel ring is secured to the casing 15 by screws 19 to insure pressure-tight joints. Mounted within the casing 15 is a motor device herein shown as a pressure-actuated bellows assembly 20 which is responsive to variations in external pressure, and thus actuates the movement mechanism in response to variations in fluid pressure within the casing. Movements of the motor device in response to such pressure variations are transmitted through standard linkage to a conventional geared movement mechanism 21. Attached to the spindle 22 of such movement is a pointer 23 which travels over a dial 24 carried by the movement frame; the spindle passing through the center of the dial and both dial and pointer being behind the glass disk 16.

Mounted within the casing is the warning unit 25 (Fig. 4) which comprises a thin plate here shown as an annular disk 26 of metal coaxial with the dial and a substantially U-shaped angular arm 27. The plate or disk 26 is supported directly behind the dial 24 and its front surface is contrastingly colored, e. g. partly red and partly black. As here shown the segmental juxtaposed red and black areas are equal in extent, each covering 180°. In the dial 24 is cut an arcuate slot 28 (Fig. 1) through which a portion of the colored surface of the disk is visible. The slot 28 is here shown as extending along the graduations from 30 to 50. The segmental colored areas are here shown as so arranged that their common boundary is radial, such boundary extending transversely across the slot. The end of the arm 27 is in a plane parallel to that of the disk 26 and has a tapped hole therein on the axis of the disk 26, which axis coincides with that of the spindle 22.

The warning unit 25 is supported and held in position in the casing by a shouldered pivot stud or screw 30 which is threaded into the tapped hole 29 of the arm 27. A spring washer 31 and lock nut 32 insure a friction-tight union between the arm 27 and screw 30 so that the signal or warning unit will not shift under its own weight or due to vibration, but can be rotated by turning the screw 30.

In order to insure that the casing is pressure-tight, the screw is seated in the hollow of a metal insert thimble 35 which is sealed by a cap screw 36 and sealing washer 37. A washer 38 is located between the spring washer 31 and the end of the thimble 35. The screw 30 is on the common axes of the spindle 22, disk 26 and tapped hole 29, so that the disk 26 when rotated turns about such common axis. In the outer face of the disk 26 are formed a plurality of small bosses 40 which bear against the rear face of the dial 24, being held in contact therewith by the spring action of the arm 27 and thus further steady the warning unit 25 and prevent any unwanted movement thereof.

The gauge is set by rotating the plate 26 so that the upper edge of the red area is at the graduation which indicates the maximum manifold pressure specified by the engine manufacturer; in Fig. 1 this pressure is 35". Thus there is provided at the dial an arcuate red line which cannot be overlooked by the operator, so that he will at all times prevent the pressure at the manifold from exceeding the specified maximum. Moreover, the arcuate line of warning is in the path of the moving pointer which the operator always keeps under observation, so that it obviously cannot be overlooked or disregarded.

If the engine in the airplane be replaced, or if the gauge be installed in another plane, the unit 25 is quickly and easily reset by removing the cap screw 36 and washer 37 and rotating the screw 30. It will be noted that this can be done quickly and easily and that if the gauge be of the pressure type as is the gauge 10, no loss of pressure will be suffered. Furthermore, this adjustment of the unit is made independently of the other mechanism in the gauge.

While one embodiment of this invention has been shown and described, it will be understood that the invention is not limited thereto and that other embodiments may be made without departing from the spirit and scope of the invention as set forth in the following claims.

I claim:

1. A pressure gauge of the kind in which a casing houses a stationary dial having an annular row of graduations, a movable pointer cooperable with said graduations, a movement mechanism including a rotary spindle to which the pointer is fixed, and pressure motor means for actuating the movement mechanism, characterized in that the dial has therein an arcuate slot so located that the pointer moves lengthwise of the slot, and further characterized in that a normally stationary plate is located behind but closely adjacent to the slotted portion of the dial, the forward surface of said plate having juxtaposed visually distinctive areas so located that their common boundary extends transversely of and is visible through the slot, and adjustable supporting means for said plate whereby the position of said boundary lengthwise of the slot may be varied.

2. A pressure gauge of the kind in which a casing houses a stationary dial having an annular row of graduations, a movable pointer cooperable with said graduations, a movement mechanism including a rotary spindle to which the pointer is fixed, and pressure motor means for actuating the movement mechanism, characterized in that the dial has an arcuate slot coaxial with the dial, and further characterized in having a stationary disk coaxial with the dial arranged behind but closely adjacent to the dial, the forward surface of said disk having juxtaposed, differently colored areas whose common boundary extends transversely of and is visible through the slot, and adjustable supporting means for said disk whereby the position of said common boundary longitudinally of the slot may be varied.

3. A pressure gauge of the kind in which a casing houses a stationary dial having an annular row of graduations, a movable pointer cooperable with said graduations, a movement mechanism including a rotary spindle to which the pointer is fixed, and pressure motor means for actuating the movement mechanism, characterized in that the dial has therein an arcuate slot coaxial with the dial, and further characterized in that a normally stationary plate is arranged behind but closely adjacent to the slotted portion of the dial, the forward surface of said plate having juxtaposed visually distinctive areas so located that their common boundary extends transversely of and is visible through the slot, a supporting arm to one end of which said plate is secured, a pivot stud secured to the other end of said arm, said stud being coaxial with the dial, a bearing for the stud carried by the casing, means whereby the stud may be turned, and means normally operative to retain the stud and arm in adjusted position.

4. A pressure gauge of the kind in which a casing houses a stationary dial having an annular row of graduations, a movable pointer cooperable with said graduations, a movement mechanism including a rotary spindle to which the pointer is fixed, and pressure motor means for actuating the movement mechanism, characterized in that the dial has therein an arcuate slot coaxial with the dial, and further characterized in that a normally stationary plate is arranged behind but closely adjacent to the slotted portion of the dial, the forward surface of said plate having juxtaposed visually distinctive areas so located that their common boundary extends transversely of and is visible through the slot, a supporting arm to one end of which said plate is fixed, a pivot stud secured to the other end of the arm, said stud being coaxial with the dial, a bearing for the stud carried by the casing, said stud having a slotted head designed to receive a screw driver for turning it, and friction means normally operative to retain the stud and arm in adjusted position.

5. A pressure gauge of the kind in which a casing houses a stationary dial having an annular row of graduations, a movable pointer cooperable with said graduations, a movement mechanism including a rotary spindle to which the pointer is fixed, and pressure motor means for actuating the movement mechanism, characterized in that the dial has therein an arcuate slot coaxial with the dial, and further characterized in that a normally stationary plate is arranged behind but closely adjacent to the slotted portion of the dial, the forward surface of said plate having juxtaposed visually distinctive areas so located that their common boundary extends transversely of and is visible through the slot, a supporting arm of substantially U-shape, one leg of said arm being fixed to the rear surface of the plate, the opposite leg of the arm being provided with a relatively fixed pivot stud which is coaxial with the dial, bearing means for the stud carried by the rear wall of the casing, the stud having a head accessible from the outside of the casing whereby the stud and arm may be turned, and means normally operative to retain the stud and arm in adjusted position.

6. A pressure gauge of the kind in which a pressure-tight casing houses a stationary dial provided with an annular row of graduations, a movable pointer cooperable with said graduations, a movement mechanism including a rotary spindle to which the pointer is fixed, and pressure motor means for actuating the movement mechanism, said pressure motor means including an element which is sensitively responsive to external pressure variations and which responds to variations in pressure within the casing, and means for supplying fluid at varying pressure to the interior of the casing, characterized in that the dial has therein a narrow slot, and further characterized in that a normally stationary signal element, disposed immediately behind the dial, has a forward surface, visible through the slot, comprising at least two juxtaposed visually distinctive areas so located that their common boundary extends transversely across the slot and is visible through the slot, and supporting means for said signal element including a stud coaxial with and fixed relatively to said element, said stud having one end arranged to be accessible from outside of the casing, and housing means for said latter end of the stud, said housing means being secured leak-tight to the casing and having a leak-tight removable cover permitting access to said end of the stud.

7. A pressure gauge of the kind in which a pressure-tight casing houses a stationary dial provided with an annular row of graduations, a movable pointer cooperable with said graduations, a movement mechanism including a rotary spindle to which the pointer is fixed, and pressure motor means for actuating the movement mechanism, said pressure motor means including an element which is sensitively responsive to external pressure variations and which responds to variations in pressure within the casing, and means for supplying fluid at varying pressure to the interior of the casing, characterized in that the dial has therein a narrow slot, and further characterized in that a normally stationary signal element, disposed immediately behind the dial, has a forward surface, visible through the slot, comprising at least two juxtaposed visually distinctive areas so located that their common boundary extends transversely across the slot and is visible through the slot, and a supporting arm having one end fixed to said signal element and having its other end disposed adjacent to the inner surface of the rear wall of the casing, said rear wall having therein an aperture, housing means fixed leak-tight in said aperture and including a removable leak-tight cap, the housing means defining a pressure-tight chamber, and a rotary element having a part disposed in said chamber and accessible from outside of the casing by removal of said cap, said rotatable element being coaxial with the dial and being fixed to that end of the supporting arm which is adjacent to the rear wall of the casing.

8. A pressure gauge including a pressure-tight casing which houses a dial having an annular row of graduations thereon, a spindle projecting through the center of the dial, means for turning said spindle, a pointer fixed to said spindle and movable thereby along said row of graduations, the dial having an arcuate slot therein concentric with said row of graduations, a normally stationary disk disposed behind and parallel to the dial, the forward surface of said disk being visible through said slot and comprising areas of distinctive appearance having a common boundary which is visible through the slot, means supporting the disk whereby it may be turned, thereby to bring said boundary into registry with any selected graduation of the dial, said supporting means including a rotatable part having an actuating element accessible outside of the casing, thereby to permit the disk to be turned, a housing for said actuating part fixed leak-tight to the casing and defining a chamber within which said actuating part it housed, and a removable pressure-tight cap for said housing normally closing said chamber leak-tight and covering said actuating portion of the rotating means.

9. A pressure gauge including a pressure-tight casing which houses a dial having an annular row of graduations thereon, a spindle projecting from the center of the dial, means for turning the spindle, a pointer fixed to the spindle and movable thereby along said row of graduations, the dial having therein an arcuate slot concentric with the row of graduations, and a normally stationary annulus parallel to the dial and coaxial with the spindle, said annulus having a forward surface which in part is visible through said slot, said surface comprising areas of distinctive appearance having a common boundary which extends transversely of the slot, an arm which supports said annulus, a rotatable part journaled in a bearing carried by the rear wall of the casing with the axis of said rotatable part coincident with the axis of the spindle, the inner end of said rotatable part being fixed to said arm and its outer end being accessible from outside the casing, thereby to permit said part to be turned and thus to rotate the annulus, a housing fixed leak-tight to the rear wall of the casing and defining a chamber in which the outer end of said rotatable part is housed, and a removable screw cap normally closing said chamber leak-tight and covering the outer end of said rotatable part, thereby to prevent leakage of pressure fluid along said rotatable part from the interior to the exterior of the casing.

10. A pressure gauge including a pressure-tight casing which houses a dial having an annular row of graduations thereon, a spindle projecting through the dial, means for turning the spindle, a pointer fixed to the spindle and movable along said row of graduations, said dial having an arcuate slot therein concentric with the row of graduations, a normally stationary plate disposed behind but closely adjacent to the dial, the forward surface of said plate being in part visible from said slot and having juxtaposed areas of distinctive appearance whose common boundary extends transversely of the slot, spaced apart positioning bosses carried by said plate which rest against the back of the dial, an arm by which said plate is supported, and a pivot stud coaxial with said row of graduations, the inner end of said stud being fixed to said arm, bearing means for the stud carried by the rear wall of the casing, the other end of the stud extending outwardly through said bearing and being accessible from outside the casing, whereby the stud may be turned for turning the plate, and means normally operative to retain the stud and plate in adjusted position.

FREDERICK G. OXLAND.